US010852711B2

(12) United States Patent
Maeda

(10) Patent No.: US 10,852,711 B2
(45) Date of Patent: Dec. 1, 2020

(54) LASER MACHINE

(71) Applicant: FANUC CORPORATION, Yamanashi (JP)

(72) Inventor: Michinori Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 112 days.

(21) Appl. No.: 16/059,518

(22) Filed: Aug. 9, 2018

(65) Prior Publication Data
US 2019/0064777 A1 Feb. 28, 2019

(30) Foreign Application Priority Data
Aug. 22, 2017 (JP) .................................. 2017-159640

(51) Int. Cl.
*G05B 19/414* (2006.01)
*G05B 19/401* (2006.01)
(Continued)

(52) U.S. Cl.
CPC ........ *G05B 19/414* (2013.01); *B23K 26/0626* (2013.01); *B23K 26/0853* (2013.01);
(Continued)

(58) Field of Classification Search
None
See application file for complete search history.

(56) References Cited

U.S. PATENT DOCUMENTS 4,547,855 A * 10/1985 Lanyi .................. B23K 26/0613
700/166

5,748,657 A * 5/1998 Gaddis .................... A61B 18/20
372/38.02

(Continued)

FOREIGN PATENT DOCUMENTS

| CN | 1781620 A | 6/2006 |
|----|-----------|--------|
| CN | 102375429 A | 3/2012 |

(Continued)

OTHER PUBLICATIONS

An Office Action; "Notice of Reasons for Refusal," issued by the Japanese Patent Office dated Jun. 4, 2019, which corresponds to Japanese Patent Application No. 2017-159640 and is related to U.S. Appl. No. 16/059,518; with English Translation.

(Continued)

*Primary Examiner* — Ibrahime A Abraham
*Assistant Examiner* — Elizabeth M Sims
(74) *Attorney, Agent, or Firm* — Studebaker & Brackett PC

(57) ABSTRACT

To provide a laser machine allowing size reduction and space saving while guaranteeing a high degree of configurational freedom. A laser machine comprises: a numerical controller; a motor current controller that controls a motor; and a basic unit that supplies DC power to a laser excitation current controller that controls a laser excitation part. The basic unit comprises: an AC input part that receives AC power; an AC/DC converter that converts the AC power supplied from the AC input part to DC power, and supplies the DC power to the motor current controller and the laser excitation current controller; and multiple connection parts that connect the basic unit to the numerical controller, the motor current controller, and the laser excitation current controller mechanically and electrically.

10 Claims, 13 Drawing Sheets

(51) Int. Cl.
*B23K 26/06* (2014.01)
*B23K 26/08* (2014.01)
*H02M 1/10* (2006.01)
*B23K 26/38* (2014.01)
*B23K 26/20* (2014.01)

(52) U.S. Cl.
CPC .......... *B23K 26/0869* (2013.01); *B23K 26/20* (2013.01); *B23K 26/38* (2013.01); *G05B 19/401* (2013.01); *G05B 2219/45041* (2013.01); *H02M 1/10* (2013.01)

(56) References Cited

U.S. PATENT DOCUMENTS

| | | | |
|---|---|---|---|
| 2003/0204283 A1 | 10/2003 | Picard et al. | |
| 2006/0107723 A1* | 5/2006 | Matsubara | B21D 24/02 72/351 |
| 2012/0035745 A1* | 2/2012 | Mori | B23K 9/0953 700/13 |
| 2014/0152201 A1* | 6/2014 | Shriven | H02P 3/08 318/376 |
| 2018/0281065 A1* | 10/2018 | Perry | B22F 3/1055 |

FOREIGN PATENT DOCUMENTS

| | | |
|---|---|---|
| CN | 103782502 A | 5/2014 |
| CN | 205362997 U | 7/2016 |
| DE | 102008013816 A1 | 10/2009 |
| JP | H08-025077 A | 1/1996 |
| JP | 2005-31469 A | 2/2005 |
| JP | 2006-095538 A | 4/2006 |
| JP | 2006-142357 A | 6/2006 |
| JP | 2011-16134 A | 1/2011 |
| JP | 2011-233659 A | 11/2011 |
| JP | 2012-35300 A | 2/2012 |

OTHER PUBLICATIONS

An Office Action mailed by the Chinese Patent Office dated Mar. 4, 2020, which corresponds to Chinese Patent Application No. 201810936804.0 and is related to U.S. Appl. No. 16/059,518.

An Office Action mailed by the German Patent Office dated Jul. 16, 2020, which corresponds to German Patent Application No. 10 2018 213 900.8 and is related to U.S. Appl. No. 16/059,518; with English language Concise Explanation.

* cited by examiner

AC POWER SUPPLY INPUT

LASER MACHINE

This application is based on and claims the benefit of priority from Japanese Patent Application No. 2017-159640, filed on 22 Aug. 2017, the content of which is incorporated herein by reference.

BACKGROUND OF THE INVENTION

Field of the Invention

The present invention relates to a laser machine.

Related Art

A solid laser oscillator at a level of hundreds of watts or more used for industrial purposes in recent years has been improved in terms of oscillation efficiency by improvement in a light-emitting element or an optical part to make the size of a machine smaller and smaller. Meanwhile, to satisfy a requirement to change a laser oscillator in response to a machining purpose, mounting and incorporation of a laser oscillator in a laser machine is still such that the laser oscillator is housed as a single part into a different housing and is installed separately from the body of the laser machine.

The functional block diagram of a conventional laser machine 61 is shown in FIG. 12, for example. FIG. 13 shows a specific example of the conventional laser machine 61.

Referring to FIG. 12, the laser machine 61 includes a numerical controller 62, a motor 63, a motor current controller 64, an AC input part 161 and an AC input part 163, an AC/DC converter 162 and an AC/DC converter 164, and a laser oscillator 71. The laser oscillator 71 further includes a laser excitation part 65, a laser excitation current controller 66, an AC input part 165, and an AC/DC converter 166.

The AC input part 161 receives AC power from an AC power supply, and supplies the AC power to the AC/DC converter 162. The AC input part 163 receives AC power from an AC power supply, and supplies the AC power to the AC/DC converter 164. The AC input part 165 receives AC power from an AC power supply, and supplies the AC power to the AC/DC converter 166.

The AC/DC converter 162 converts the AC power supplied from the AC input part 161 to DC power, and supplies the DC power to the numerical controller 62. The AC/DC converter 164 converts the AC power supplied from the AC input part 163 to DC power, and supplies the DC power to the motor current controller 64. The AC/DC converter 166 converts the AC power supplied from the AC input part 165 to DC power, and supplies the DC power to the laser excitation current controller 66.

The numerical controller 62 is a part that controls an axis for moving a machining point and laser output. The motor 63 is a motor provided in the laser machine 61 and to be driven for moving a scanner or a machining table of the laser machine 61, for example. The motor current controller 64 is a part that drives the motor 63 by controlling supply of a driving current from the AC/DC converter 164 to the motor 63. The laser excitation part 65 is a part that generates a laser beam. The laser excitation current controller 66 is a part that drives the laser excitation part 65 by controlling supply of a driving current from the AC/DC converter 166 to the laser excitation part 65. The numerical controller 62, the motor current controller 64, and the laser excitation current controller 66 are connected so as to be capable of communicating with each other. In this way, the numerical controller 62 becomes capable of controlling the behavior of an axis and laser output, as described above.

Referring to FIG. 13, the laser machine 61 includes a motor 63A, a motor 63B, a motor 63C, a laser machine control panel 67, the laser oscillator 71, an air conditioner 101, an optical fiber 102, a machining head 103, and a machining table 104. The laser machine control panel 67 includes the numerical controller 62, a motor current controller 64A, a motor current controller 64B, a motor current controller 64C, the AC input part 163, and the AC/DC converter 164. The laser oscillator 71 further includes the laser excitation part 65, the laser excitation current controller 66, the AC input part 165, and the AC/DC converter 166. For simplification of illustration of FIG. 13, only the AC input part 163 and the AC/DC converter 164 of the laser machine control panel 67 are shown, and the AC input part 161 and the AC/DC converter 162 are omitted.

The motor 63A is provided at the machining head 103. Based on a command from the numerical controller 62, the motor current controller 64A drives the motor 63A, thereby moving the machining head 103. The motors 63B and 63C are provided at the machining table 104. Based on commands from the numerical controller 62, the motor current controllers 64B and 64C drive the motors 63B and 63C respectively, thereby moving the machining table 104. The motor current controller 64A corresponds to the motor 63A and controls a driving current to be supplied to the motor 63A, thereby driving the motor 63A. Likewise, the motor current controller 64B corresponds to the motor 63B and controls a driving current to be supplied to the motor 63B, thereby driving the motor 63B. Likewise, the motor current controller 64C corresponds to the motor 63C and controls a driving current to be supplied to the motor 63C, thereby driving the motor 63C.

The laser excitation part 65 is driven by the laser excitation current controller 66 to generate a laser beam. The generated laser beam passes through the optical fiber 102 and reaches the machining head 103. An area where the laser oscillator 71 exists is air conditioned by the air conditioner 101.

As illustrated in FIG. 13, the laser oscillator 71 is equipped with the AC/DC converter 166 that generates power for excitation of a laser beam, and the AC input part 165 that receives power from an AC power supply and supplies the power to the AC/DC converter 166. The laser machine control panel 67 of the laser machine 61 is equipped with the AC/DC converter 164 that generates power for driving the motors 63A to 63C, and the AC input part 163 that receives power from an AC power supply and supplies the power to the AC/DC converter 164 separately from the AC/DC converter 166 and the AC input part 165. Specifically, the laser machine 61 as a whole has a redundant configuration including split circuits of the same type. This necessitates the following input unit of the laser machine 61 to be further provided separately at the laser oscillator 71: an input unit including the AC/DC converter 164 for a motor or the motor current controllers 64A to 64C equipped with an energy-saving function such as power supply regeneration, an automatic backup function responsive to power failure, or an automatic restarting function, and the AC input part 163 having a multi-input voltage responsive function responsive to voltages from 200 to 400 V. This has caused increase in parts or connection lines, or complexity of a control method.

Further, providing the laser oscillator 71 and the laser machine control panel 67 separately causes wasteful space and routing of connection lines in each of their housings to become a hindrance to size reduction, reduction in footprint, and enhanced productivity of the laser machine 61 as a whole. Further, wasteful transfer of a control signal or a driving current has caused harmful effect in terms of the occurrence of delay or malfunction of a control system or power loss.

In a solid laser oscillator, to ensure the long life and reliability of a semiconductor laser as a light-emitting element, the semiconductor laser is cooled positively using an air cooling fan or cooling water and a Peltier element, for example. Meanwhile, the semiconductor laser is extremely sensitive to dew condensation, so that a humidity around the semiconductor laser is managed using the air conditioner 101 so as not to cause dew condensation. If the laser oscillator 71 is a structure separate and independent from the laser machine control panel 67 like in the foregoing case, the interior of the housing of the laser oscillator 71 or a zone including the semiconductor laser should be air conditioned entirely using a cooler or a dehumidifier, for example. In some cases, the air conditioning may be done to cover zones at the laser oscillator 71 where the AC/DC converter 166, the AC input part 165, and the laser excitation current controller 66 exist that inherently require no air conditioning. This requires installation of an air conditioner having higher performance than necessary to become a hindrance to size reduction, cost reduction, and reduction in running cost of the machine.

As described above, incorporating a laser oscillator in a laser machine as a separate unit has many disadvantages. Hence, a rational integration between the laser machine and the laser oscillator has been desired.

In particular, a carbon dioxide gas laser having mainly been used as a laser oscillator for laser machining has low laser oscillation efficiency. To produce laser output necessary for laser machining, large power or a large power supply has been required. By contrast, a semiconductor laser has laser oscillation efficiency at a level many times higher than the carbon dioxide gas laser so a compact power supply is applicable. This is also the reason why a rational integration between the laser machine and the laser oscillator has been desired.

In this regard, patent document 1 discloses use of one power supply to supply power to a laser oscillator and to a motor in a laser machine. According to patent document 2, a motor and a laser oscillator are considered to be controlled by a common control system and are considered to be supplied with power from a common power supply system.

Patent Document 1: Japanese Unexamined Patent Application, Publication No. 2006-095538

Patent Document 2: Japanese Unexamined Patent Application, Publication No. H08-025077

SUMMARY OF THE INVENTION

Patent document 1 states that both a laser source unit and a scanning unit are supplied with power from a control unit. However, patent document 1 does not state connection between the control unit and the laser source unit and connection between the control unit and the scanning unit in detail, failing to guarantee a high degree of freedom in configuring a laser machine. This eventually fails to guarantee fulfillment of size reduction of the laser machine as a whole and reduction in transmission loss of power.

Additionally, patent document 2 merely suggests sharing of a power supply. Like patent document 1, patent document 2 does not state connection between an excitation power supply, a CPU, and an axis control circuit in detail, failing to guarantee a high degree of freedom in configuring a laser machine. This eventually fails to guarantee fulfillment of size reduction of the laser machine as a whole and reduction in transmission loss of power.

The present invention is intended to provide a laser machine allowing size reduction and space saving while guaranteeing a high degree of configurational freedom.

(1) A first laser machine according to the present invention (laser machine 1 described later, for example) comprises: a numerical controller (numerical controller 12 described later, for example) that controls motion of an axis for moving a machining point and output of a laser beam; a motor (motor 13 described later, for example) that causes the motion of the axis; a motor current controller (motor current controller 14 described later, for example) that controls a driving current for the motor; a laser excitation part (laser excitation part 15 described later, for example) that generates the laser beam; a laser excitation current controller (laser excitation current controller 16 described later, for example) that controls a driving current for the laser excitation part; and a basic unit (basic unit 11 described later, for example) that supplies DC power to the numerical controller, the motor current controller, and the laser excitation current controller. The basic unit comprises: an AC input part (AC input part 113 described later, for example) that receives AC power; an AC/DC converter (AC/DC converter 114 described later, for example) that converts the AC power supplied from the AC input part to DC power, and supplies the DC power to the motor current controller and the laser excitation current controller; and multiple connection parts (connection parts 21 described later, for example) that connect the basic unit to the numerical controller, the motor current controller, and the laser excitation current controller.

(2) A second laser machine according to the present invention (laser machine 1A described later, for example) comprises: a numerical controller (numerical controller 12 described later, for example) that controls motion of an axis for moving a machining point and output of a laser beam; a motor (motor 13 described later, for example) that causes the motion of the axis; a motor current controller (motor current controller 14 described later, for example) that controls a driving current for the motor; a laser excitation part (laser excitation part 15 described later, for example) that generates the laser beam; a laser excitation current controller (laser excitation current controller 16 described later, for example) that controls a driving current for the laser excitation part; an AC/DC converter (AC/DC converter 114 described later, for example) that converts received AC power to DC power, and supplies the DC power to the motor current controller and the laser excitation current controller; and a basic unit (basic unit 11A described later, for example) that supplies DC power to the numerical controller and supplies AC power to the AC/DC converter. The basic unit comprises: an AC input part (AC input part 113 described later, for example) that receives AC power and supplies the AC power to the AC/DC converter; and multiple connection parts (connection parts 21 described later, for example) that connect the basic unit to the numerical controller, the motor current controller, the laser excitation current controller, and the AC/DC converter.

(3) In the laser machine described in (1) or (2), each of the multiple connection parts (connection parts 21 described later, for example) may be connectable to at least one type of the numerical controller (numerical controller 12 described later, for example), the motor current controller (motor current controller 14 described later, for example), the laser excitation current controller (laser excitation current controller 16 described later, for example), and the AC/DC converter (AC/DC converter 114 described later, for example).

(4) In the laser machine described in (1) to (3), the basic unit may comprise communication means (communication means 31 described later, for example) and/or power transmission means (power transmission means 32 described later, for example). The communication means establishes communication between the numerical controller (numerical controller 12 described later, for example), the motor current controller (motor current controller 14 described later, for example), and the laser excitation current controller (laser excitation current controller 16 described later, for example). The power transmission means transmits power from the AC/DC converter to the motor current controller and the laser excitation current controller.

(5) In the laser machine described in (4), the connection parts (connection parts 21 described later, for example) may be connected to the communication means (communication means 31 described later, for example) and/or the power transmission means (power transmission means 32 described later, for example).

(6) The laser machine described in (4) or (5) may comprise: one or both of a power supply regeneration part (power supply regeneration part 41 described later, for example) that feeds counter-electromotive force of the motor back into the AC input part, and a power generation part (power generation part 42 described later, for example) that recovers heat energy generated by laser machining and converts the recovered heat energy to electric energy; and a power storage part (power storage part 43 described later, for example) that stores power supplied from the power supply regeneration part and/or the power generation part. The power supply regeneration part, the power generation part, and the power storage part may be connected to the power transmission means.

(7) In the laser machine described in (6), at least one of the power supply regeneration part (power supply regeneration part 41 described later, for example), the power generation part (power generation part 42 described later, for example), and the power storage part (power storage part 43 described later, for example) may be connected to the communication means.

(8) In the laser machine described in (6) or (7), the communication means (communication means 31 described later, for example) and the power transmission means (power transmission means 32 described later, for example) may each comprise a connection part (connection part 22 described later, for example) for connection to a different laser machine.

The present invention allows size reduction and space saving of a laser machine while guaranteeing a high degree of configurational freedom.

DETAILED DESCRIPTION OF THE INVENTION

Outline of Invention

Figure 1:
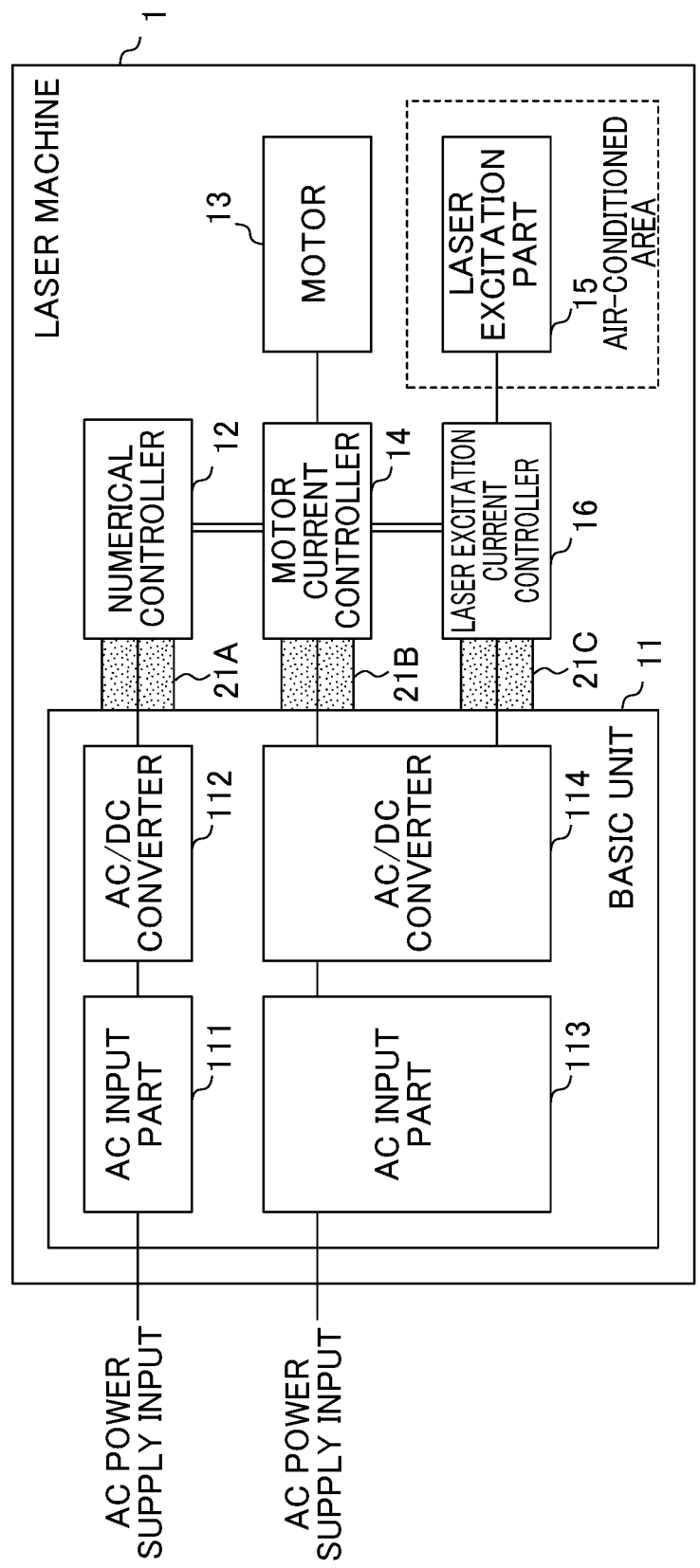
FIG. 1 is a functional block diagram of a laser machine according to a first embodiment of the present invention.

As described above, according to the conventional technique, a laser machine includes: a numerical controller that controls an axis for moving a machining point and laser output; a motor; a motor current controller that drives the motor; a laser excitation part that generates a laser beam; a laser excitation current controller that drives the laser excitation part; and an AC input part and an AC/DC converter for each of the controllers, etc. A laser oscillator is housed in an independent housing so as to be capable of operating alone, and includes a dedicated AC input part and a dedicated AC/DC converter. Like the laser oscillator, the motor of the laser machine also requires the AC input part and the AC/DC converter. Hence, from the viewpoint of the laser machine equipped with the laser oscillator, the AC input part and the AC/DC converter are divided to provide AC input parts at two places and AC/DC converters at two places. This results in a redundant design in terms of space and cost.

By integrating the AC input part for the laser oscillator with the AC input part for the motor and integrating the AC/DC converter for the laser oscillator with the AC/DC converter for the motor and sharing the AC input part and the AC/DC converter, wasteful space can be reduced and parts count can be reduced. If a DC voltage required for the motor and a DC voltage required for the laser excitation part differ from each other, only the AC input part may be shared.

The foregoing shared AC input part and shared AC/DC converter are combined into one unit. Here, this unit is called a "basic unit."

The basic unit may be configured in such a manner that the basic unit is housed in one housing alone or multiple modules of the basic unit are housed in one housing. The basic unit may also be mounted on one circuit board. Alternatively, the basic unit may be configured to have both of these configurations. In consideration of maintainability or expandability, the AC/DC converter may not be contained in the basic unit but may be provided as a separate part. If the numerical controller requires an AC input part or an AC/DC converter, the numerical controller may be allowed to use one or both of the shared AC input part and the shared AC/DC converter in the basic unit. Compared to the motor and the laser oscillator, the numerical controller requires only a slight amount of power. Thus, a circuit dedicated to the numerical controller may be provided in the basic unit.

Alternatively, power may be introduced from outside to the numerical controller without intervention of the basic unit.

As described above, the AC/DC converter and the AC input part are shared between the laser machine and the laser oscillator. Thus, functions provided to the laser machine including an energy-saving function, a power failure responsive function, a multi-input voltage responsive function, etc. also become applicable to the laser oscillator to allow size reduction and increased functions of the laser machine.

Further, a constituting part such as a power supply part not requiring air conditioning is moved from the laser oscillator to the laser machine. This can minimize an area of air conditioning in the laser oscillator to allow energy saving and size reduction.

According to the present invention, the laser machine is not limited to a laser cutting machine but it includes machines of every type for machining on a material by applying a laser beam to the material and controlling the laser beam and laser output such as a welding machine, a surface modifying machine, and an additive manufacturing machine, for example.

Each embodiment of the present invention will be described in detail below by referring to FIGS. 1 to 7.

First Embodiment

FIG. 1 is a functional block diagram of a laser machine 1 according to a first embodiment of the present invention. The laser machine 1 includes a basic unit 11, a numerical controller 12, a motor 13, a motor current controller 14, a laser excitation part 15, a laser excitation current controller 16, and a connection part 21A, a connection part 21B, and a connection part 21C (in the following description, these connection parts may be called "connection parts 21" collectively). The basic unit 11 further includes an AC input part ill, an AC/DC converter 112, an AC input part 113, and an AC/DC converter 114.

The basic unit 11 is a unit that supplies DC power to the numerical controller 12, the motor current controller 14, and the laser excitation current controller 16. In this way, the basic unit 11 fulfills a function as a power supply part. However, this is not the only function of the basic unit 11 but the basic unit 11 may have different functions. The AC input part 111 receives AC power from an AC power supply, and supplies the AC power to the AC/DC converter 112. The AC/DC converter 112 converts the AC power supplied from the AC input part 111 to DC power, and supplies the DC power to the numerical controller 12 through the connection part 21A described later. The AC input part 113 receives AC power from an AC power supply, and supplies the AC power to the AC/DC converter 114. The AC/DC converter 114 converts the AC power supplied from the AC input part 113 to DC power, and supplies the DC power to the motor current controller 14 through the connection part 21B and supplies the DC power to the laser excitation current controller 16 through the connection part 21C. Specifically, the AC input part 113 is an AC input part shared between the motor current controller 14 and the laser excitation current controller 16. The AC/DC converter 114 is an AC/DC converter shared between the motor current controller 14 and the laser excitation current controller 16.

The numerical controller 12 is a part that controls an axis for moving a machining point and laser output. The motor 13 is a motor provided in the laser machine 1 and to be driven for moving a scanner or a machining table of the laser machine 1, for example. The motor current controller 14 is a part that drives the motor 13 by controlling supply of a driving current from the AC/DC converter 114 to the motor 13. The laser excitation part 15 is a part that generates a laser beam. The laser excitation current controller 16 is a part that drives the laser excitation part 15 by controlling supply of a driving current from the AC/DC converter 114 to the laser excitation part 15. The numerical controller 12, the motor current controller 14, and the laser excitation current controller 16 are connected so as to be capable of communicating with each other. In this way, the numerical controller 12 becomes capable of controlling the behavior of an axis and laser output, as described above.

The connection part 21A connects the AC/DC converter 112 and the numerical controller 12 mechanically and electrically. The connection part 21B connects the AC/DC converter 114 and the motor current controller 14 mechanically and electrically. The connection part 21C connects the AC/DC converter 114 and the laser excitation current controller 16 mechanically and electrically. Each of the connection parts 21 has both a structure for mechanically connecting and integrating the basic unit and a corresponding controller and a structure for electrically connecting the basic unit and a corresponding controller. The basic unit and each controller may be mechanically connected by fastening with a screw or by making a fit between fitting structures formed at parts of housings of the basic unit and each controller. The electrical connection may be established using one or both of a screw terminal and a connector capable of being inserted and removed easily. Each of the connection parts 21 may have a connection structure dedicated to a corresponding one of the numerical controller 12, the motor current controller 14, and the laser excitation current controller 16. Alternatively, if the connection part is designed to allow common connection to any of these three types of controllers, a degree of freedom in connection of each controller to the basic unit 11 is increased. This facilitates work of adding an auxiliary axis to an existing laser machine or work of adding a laser oscillator to the existing laser machine.

Effect Achieved by First Embodiment

Sharing the AC input part and the AC/DC converter between the motor 13 and the laser oscillator makes it possible to reduce wasteful space and the number of connection cables relating to each of the motor 13 and the laser oscillator, thereby allowing size reduction of the laser machine 1 as a whole and reduction in transmission loss of power. The shared AC input part and the shared AC/DC converter are combined in one basic unit 11 to achieve further size reduction and further reduction in the number of connection cables.

By integrating the AC input part and the AC/DC converter for the laser oscillator in the basic unit 11 and connecting the laser excitation current controller 16 to the basic unit 11, only the laser excitation part 15 of the laser oscillator becomes separable. Thus, only minimum required air conditioning equipment can be prepared to be used for the laser excitation part 15, allowing significant reduction in power involved in air conditioning and significant reduction in cost of the air conditioning equipment.

By configuring the multiple connection parts 21 as common connection parts, each of the connection parts 21 is allowed to establish connection to the numerical controller 12, the motor current controller 14, and the laser excitation current controller 16. With this configuration, the function of an existing laser machine can easily be improved to provide a multi-path laser machine by adding a motor or the laser excitation part 15, if necessary, to the existing laser machine and increasing the number of control axes. Further, product planning and design for expanding a lineup of laser machines can be done easily.

Second Embodiment

Figure 2:
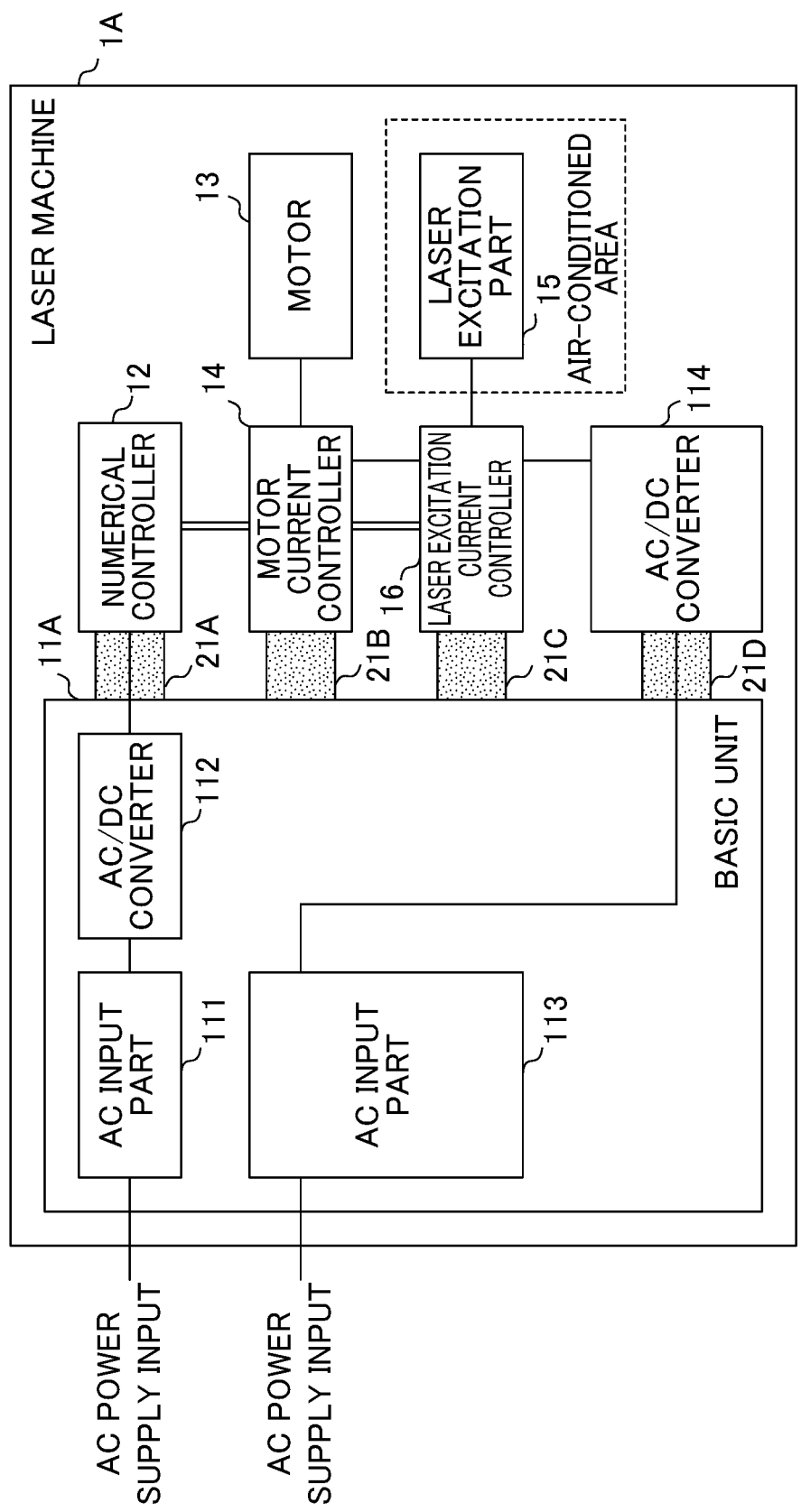
FIG. 2 is a functional block diagram of a laser machine according to a second embodiment of the present invention.

FIG. 2 is a functional block diagram of a laser machine 1A according to a second embodiment of the present invention. In the following description, a constituting element of the laser machine 1A same as the constituting element of the laser machine 1 will be given the same sign and will not be described. The following detailed description is mainly intended for technical features of the laser machine 1A differing from those of the laser machine 1.

In the laser machine 1A, a basic unit 11A does not include the AC/DC converter 114 but the AC/DC converter 114 is provided outside the basic unit 11A. The AC/DC converter 114 is connected to the AC input part 113 in the basic unit 11A mechanically and electrically through a connection part 21D.

In the laser machine 1A, supply of power from the AC/DC converter 114 to the motor current controller 14 and the laser excitation current controller 16 is realized outside the basic unit 11A. Specifically, the connection part 21B connects the basic unit 11A and the motor current controller 14 only mechanically, and the connection part 21C connects the basic unit 11A and the laser excitation current controller 16 only mechanically. As partially described above, each of the connection parts 21 may have a connection structure dedicated to a corresponding one of the numerical controller 12, the motor current controller 14, and the laser excitation current controller 16. Alternatively, if the connection part is designed to allow common connection to any of these three types of controllers and to the AC/DC converter, a degree of freedom in connection of each controller to the basic unit and a degree of freedom in connection to the AC/DC converter are increased. This facilitates work of adding an auxiliary axis to an existing laser machine or work of adding a laser oscillator to the existing laser machine.

Effect Achieved by Second Embodiment

The second embodiment achieves effect comparable to the effect of the first embodiment. Further, by the provision of the AC/DC converter 114 outside the basic unit 11A, the AC/DC converter 114 can be changed easily in response to failure in the AC/DC converter 114.

Third Embodiment

Figure 3:
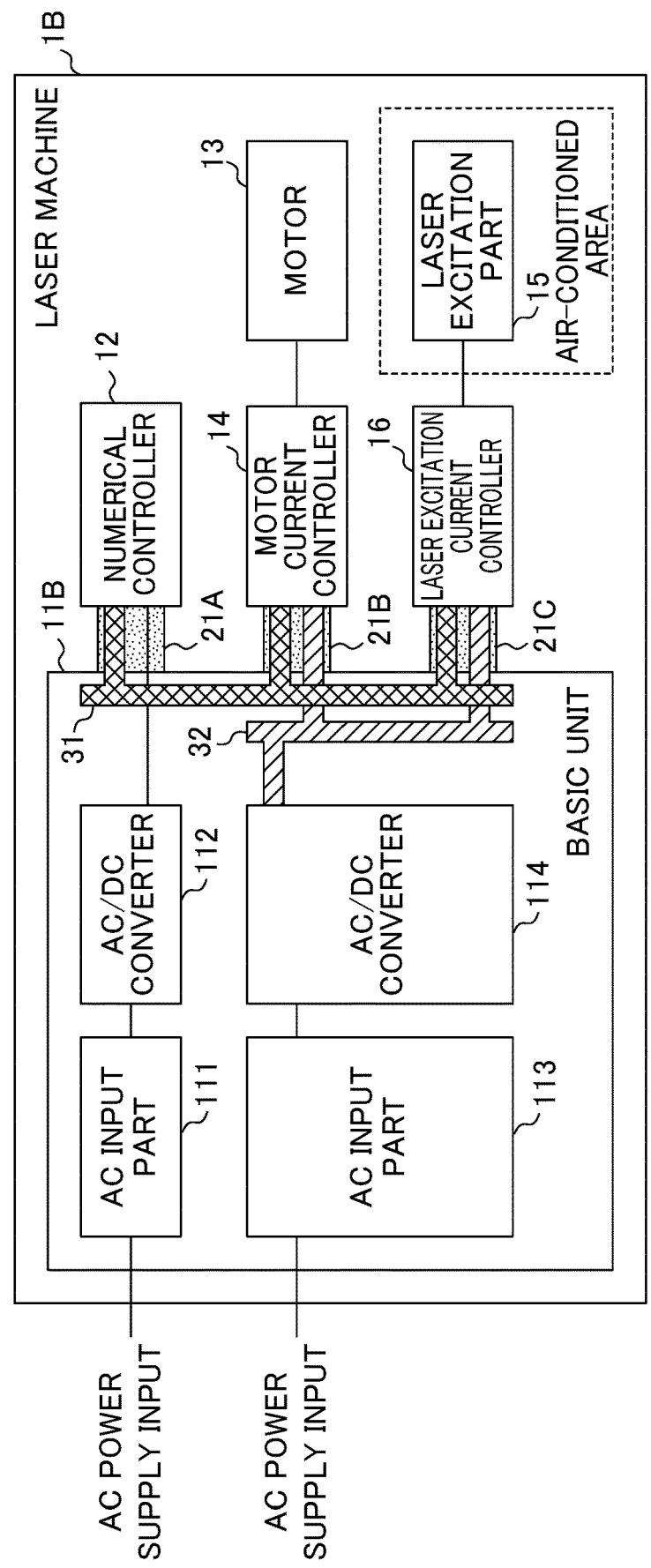
FIG. 3 is a functional block diagram of a laser machine according to a third embodiment of the present invention.

FIG. 3 is a functional block diagram of a laser machine 1B according to a third embodiment of the present invention. In the following description, a constituting element of the laser machine 1B same as the constituting element of the laser machine 1 will be given the same sign and will not be described. The following detailed description is mainly intended for technical features of the laser machine 1B differing from those of the laser machine 1.

In the laser machine 1B, a basic unit 11B includes communication means 31 and power transmission means 32 in addition to the constituting elements of the basic unit 11 of the laser machine 1.

The communication means 31 transmits an axis movement command and a laser output command generated from a machining program by the numerical controller 12 to the motor current controller 14 and the laser excitation current controller 16. By doing so, a workpiece becomes capable of receiving an applied laser beam and capable of being subjected to intended laser machining. Either a parallel system or a serial system may be applicable to signal transmission.

The power transmission means 32 transmits power from the AC/DC converter 114 of the basic unit 11B to the motor current controller 14 and the laser excitation current controller 16 connected to the basic unit 11B through the connection parts 21. This achieves the shortest distance of transmission of a DC current to allow power transmission with low loss.

Each of the communication means 31 and the power transmission means 32 may be a pattern on a circuit board or a copper bar, for example. Further, each of the communication means 31 and the power transmission means 32 may include a communication control element for signal processing, a storage element, a different control element, and an EMC responsive part such as a filter or a shield for noise reduction. The communication means 31 and the power transmission means 32 are electrically connected to the foregoing connection parts 21 to establish connection to each controller simply and smoothly. More specifically, a signal connector and a power connector are arranged at each connection part 21, and these connectors are configured to be inserted into and removed from a corresponding controller. To ensure mechanical strength, a way of fastening with a screw and a way of making a fit may be used in combination, for example, thereby achieving a controller with high reliability.

Effect Achieved by Third Embodiment

The basic unit 11B includes the communication means 31 and the power transmission means 32. The communication means 31 relays transfer of control signals to the numerical controller 12, the motor current controller 14, and the laser excitation current controller 16. The power transmission means 32 transfers power from the AC/DC converter 114 to the motor current controller 14 and the laser excitation current controller 16. In this way, many of necessary connection wires can be housed in the basic unit 11B to allow significant reduction in wiring parts and reduction in the burden of assembly. Further, the provision of the communication means 31 allows connection of each controller by the shortest distance. This increases the speed, stability, and noise tolerance of a control system in the laser machine 1B, contributing to increased reliability and increased operating rate of the laser machine 1B. Additionally, the provision of the power transmission means 32 allows the AC/DC converter 114 to be connected to the motor current controller 14 and the laser excitation current controller 16 by the shortest transmission distance. This can reduce power loss in the laser machine 1B, contributing to energy saving and reduction in running cost. Further, signals and power are transferred between the communication means 31 and the power transmission means 32 of the basic unit 11B and the controllers through the connection parts 21. This reduces the burden of wiring of connection cables between the controllers, so that the laser machine can be constructed at low cost.

Fourth Embodiment

Figure 4:
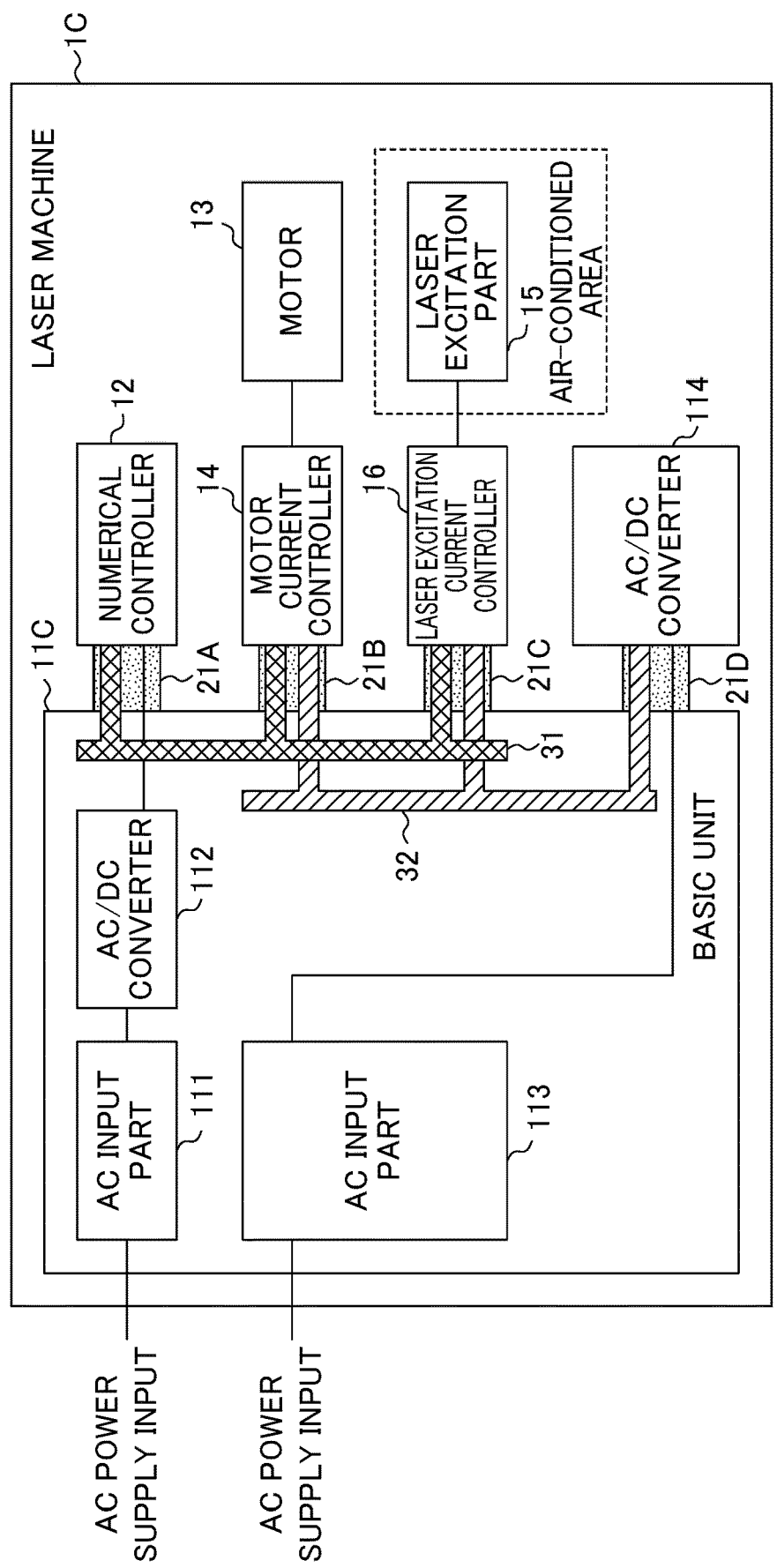
FIG. 4 is a functional block diagram of a laser machine according to a fourth embodiment of the present invention.

FIG. 4 is a functional block diagram of a laser machine 1C according to a fourth embodiment of the present invention. In the following description, a constituting element of the laser machine 1C same as the constituting element of the laser machine 1A will be given the same sign and will not be described. The following detailed description is mainly intended for technical features of the laser machine 1C differing from those of the laser machine 1A.

In the laser machine 1C, a basic unit 11C includes communication means 31 and power transmission means 32 in addition to the constituting elements of the basic unit 11A of the laser machine 1A. The communication means 31 will not be described as it has the same function as the communication means 31 in the laser machine 1B according to the third embodiment.

The power transmission means 32 transmits power from the AC/DC converter 114 connected to the basic unit 11C through the connection part 21D to the motor current controller 14 and the laser excitation current controller 16 connected to the basic unit 11C through the connection parts 21B and 21C respectively. This achieves the shortest distance of transmission of a DC current to allow power transmission with low loss.

Effect Achieved by Fourth Embodiment

The fourth embodiment achieves effect comparable to the effect of the third embodiment. In particular, by the presence of the AC/DC converter 114 outside the basic unit 11C and by the connection of the AC/DC converter 114 to the basic unit 11C through the connection part 21D, wiring parts and the burden of assembly can be reduced significantly.

Fifth Embodiment

Figure 5:
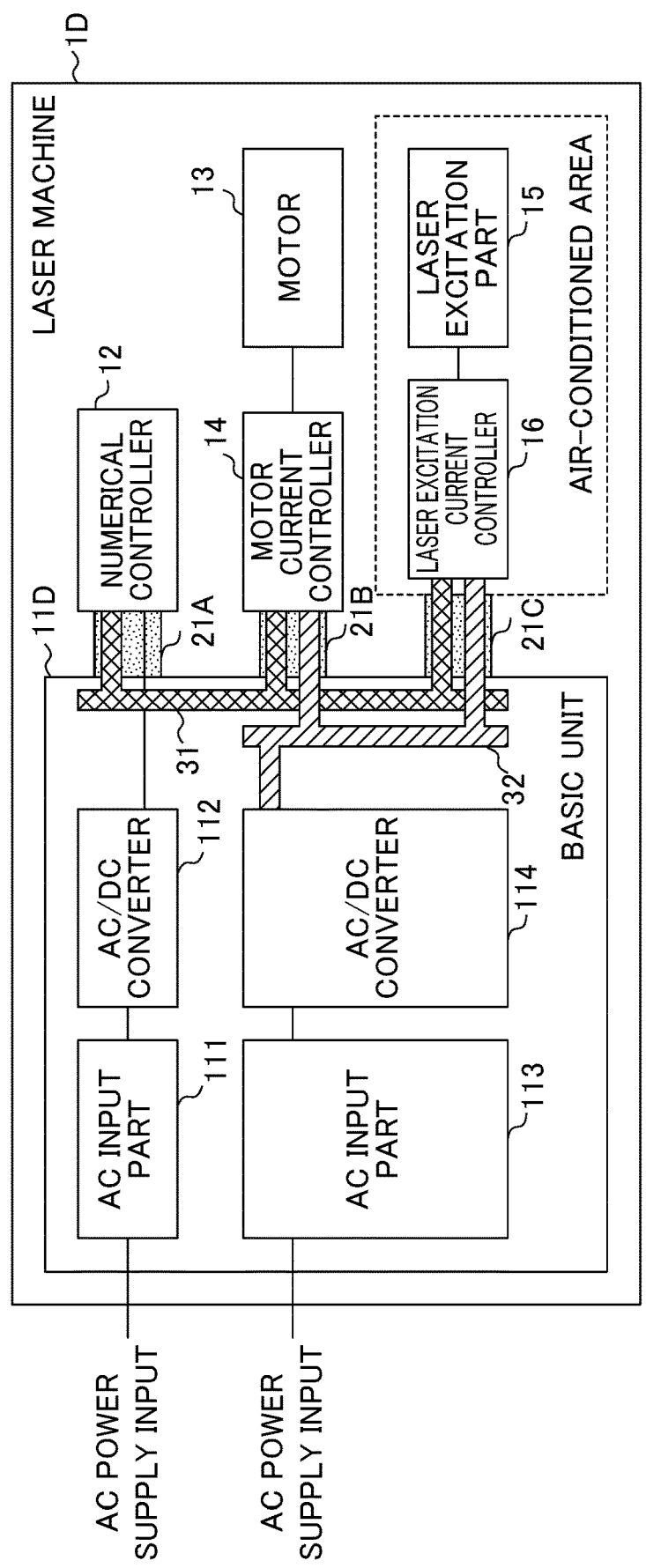
FIG. 5 is a functional block diagram of a laser machine according to a fifth embodiment of the present invention.

FIG. 5 is a functional block diagram of a laser machine 1D according to a fifth embodiment of the present invention. In the following description, a constituting element of the laser machine 1D same as the constituting element of the laser machine 1B will be given the same sign and will not be described. The following detailed description is mainly intended for technical features of the laser machine 1D differing from those of the laser machine 1B.

In the laser machine 1B, only the laser excitation part 15 is arranged in an air-conditioned area. By contrast, in the laser machine 1D, the laser excitation current controller 16 is partially or entirely incorporated in the laser excitation part 15, so that the laser excitation current controller 16 is arranged in the air-conditioned area in addition to the laser excitation part 15.

In each of the first to fourth embodiments, the AC input part 113 and the AC/DC converter 114 of the laser oscillator part are moved from the housing of the laser oscillator into the basic unit 11, 11A, 11B, or 11C, and the laser excitation current controller 16 is connected to the basic unit 11, 11A, 11B, or 11C. By doing so, only the laser excitation part 15 remains as the laser oscillator in the housing to allow significant reduction in the volume of the housing. Thus, an air conditioner required for the laser excitation part 15 can be changed to one of low performance, thereby allowing size reduction and energy saving of the machine.

The laser excitation current controller 16 controls a laser excitation current by modulating the pulse of a DC current using high-speed switching elements. These elements may be required to be cooled sufficiently in response to a used current. Thus, like in this embodiment, the laser excitation current controller 16 may partially or entirely be incorporated in the laser excitation part 15.

Effect Achieved by Fifth Embodiment

The laser excitation part 15 in a kilowatt-class laser oscillator includes a water-cooled part or a Peltier element for cooling laser medium. This is used preferably for cooling the switching elements of the laser excitation current controller 16 efficiently. From the viewpoint of the laser machine 1D, water-cooled parts can be gathered in one place to bring about advantages in terms of increased reliability and cost. Further, providing the laser excitation current controller 16 and the laser excitation part 15 in the same area achieves simpler piping. Additionally, connecting the laser excitation part 15 and the laser excitation current controller 16 by the shortest distance can increase the speed of responsiveness of a laser beam output to a pulse command, allowing increase in a laser machining quality.

Sixth Embodiment

Figure 6:
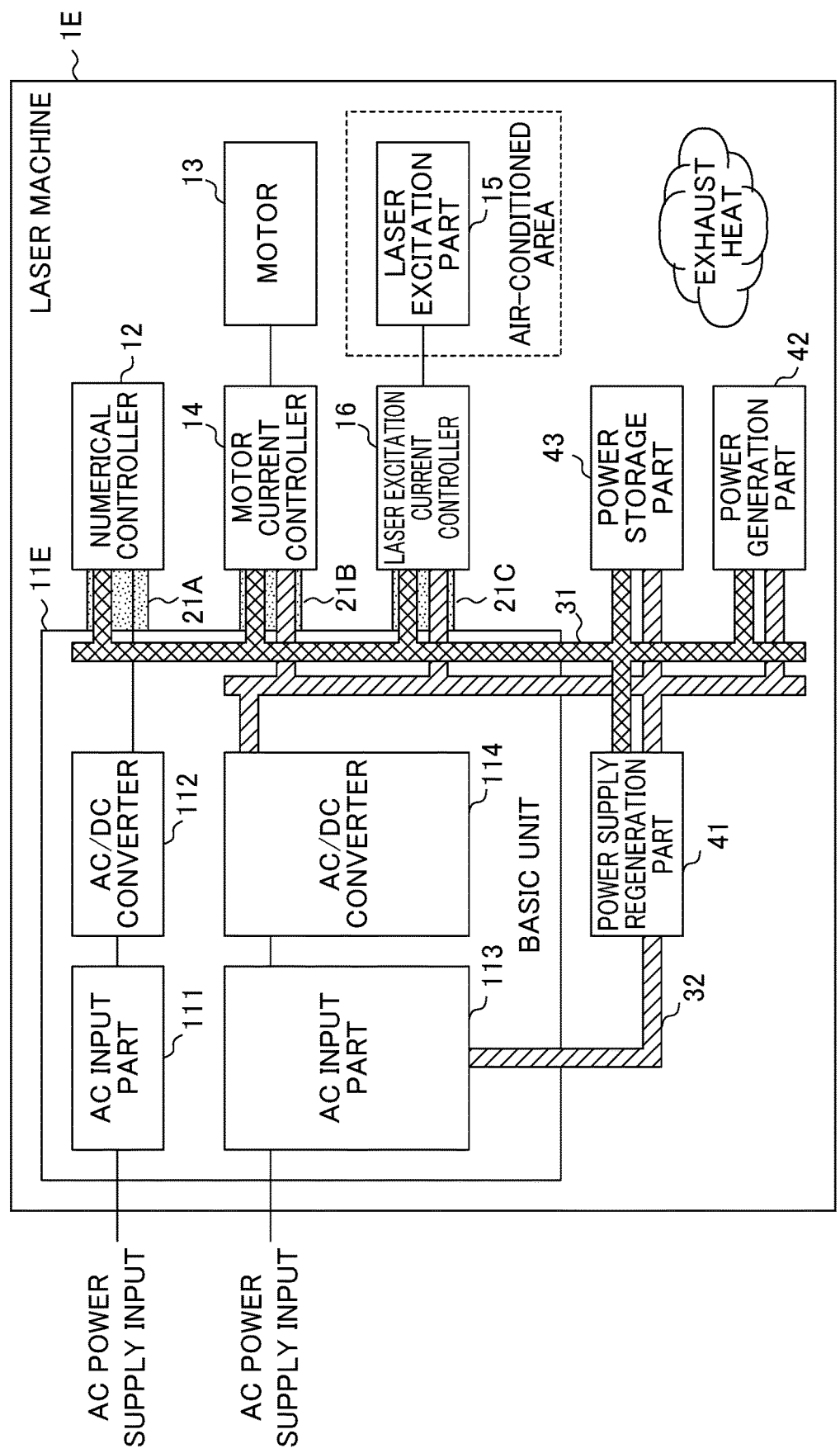
FIG. 6 is a functional block diagram of a laser machine according to a sixth embodiment of the present invention.

FIG. 6 is a functional block diagram of a laser machine 1E according to a sixth embodiment of the present invention. In the following description, a constituting element of the laser machine 1E same as the constituting element of the laser machine 1B will be given the same sign and will not be described. The following detailed description is mainly intended for technical features of the laser machine 1E differing from those of the laser machine 1B.

The laser machine 1E includes a power supply regeneration part 41, a power generation part 42, and a power storage part 43 in addition to the constituting elements of the laser machine 1B. These parts are connected to the communication means 31 and the power transmission means 32.

The power supply regeneration part 41 feeds counter-electromotive force of the motor 13, more specifically, a regenerative current generated during deceleration of the motor 13 back into the AC input part 113. The power supply regeneration part 41 may store this regenerative current into the power storage part 43.

The power generation part 42 converts heat energy generated by laser machining to electric energy, and stores the electric energy into the power storage part 43. More specifically, the power generation part 42 recovers surplus heat exhausted during oscillation of the laser oscillator or heat energy generated from a workpiece during machining, and stores the recovered energy into the power storage part 43.

The power storage part 43 stores power supplied from the power supply regeneration part 41 and/or the power generation part 42.

Feeding a regenerative current generated during deceleration of a motor back into an AC power supply, or storing the regenerative current into a power storage part and recycling the regenerative current is a technique having been developed as one of techniques for energy saving of machine tools. Meanwhile, development of high-efficient solid lasers for laser machines is proceeding. However, a good deal of effort has not been made for energy recycle in such laser machines.

As described above, in this embodiment, energy is recovered in the laser oscillator by a method of using a heating value generated during laser oscillation and a heating value generated from a workpiece during machining, thereby generating power.

More specifically, the laser oscillator has oscillation efficiency of several tens of percent, so that half or more of introduced power is recovered mainly in cooling water as exhaust heat. Meanwhile, a workpiece having received an applied laser beam is heated to be increased in temperature. The foregoing types of heat energy are recovered and converted to electric energy by the power generation part 42, and stored into the power storage part 43.

The power supply regeneration part 41, the power generation part 42, and the power storage part 43 are connected to the communication means 31 and the power transmission means 32 of a basic unit 11E. The numerical controller 12 determines a situation of use of energy in the laser machine 1E, and controls the operations of the power supply regeneration part 41, the power generation part 42, and the power storage part 43 so as to reduce power usage, thereby achieving running of the laser machine 1E resulting in minimum energy consumption. The power storage part 43 may be a capacitive part such as a capacitor, a rechargeable battery, or a converter to kinetic energy.

To increase the operating rate of the laser machine 1E, countermeasure may be required against the occurrence of power failure. What has conventionally occurred in response to power failure during laser machining is that laser oscillation stops immediately, and an axis moves for a while through inertia in the laser machine and then stops. By doing so, a machining condition or positional information at the time immediately before the power failure is lost. Hence, restarting after restoration of power or restarting the machining takes time, or it becomes difficult to restart the machining accurately. In some cases, a machining axis drops to damage a workpiece or a machining head.

In the laser machine 1E of this embodiment, if the numerical controller 12 detects power failure, power stored in the power storage part 43 is used to stop the motor 13 safely and information about the laser machine 1E immediately before the power failure can be stored into a non-volatile storage in the numerical controller 12. In this way, restoration work at the time of restoration of power can be done promptly and accurately.

Effect Achieved by Sixth Embodiment

The regenerative power of the motor or the energy of exhaust heat generated during laser machining can be shared in the laser machine as a whole, so that the laser machine having excellent energy efficiency can be provided. Further, the numerical controller 12 monitors a situation of running of the motor 13 and that of the laser excitation part 15, and monitors power at each part. By doing so, recycle of energy can be controlled and optimized in the laser machine 1E as a whole, thereby achieving optimum energy-saving running.

Seventh Embodiment

Figure 7:
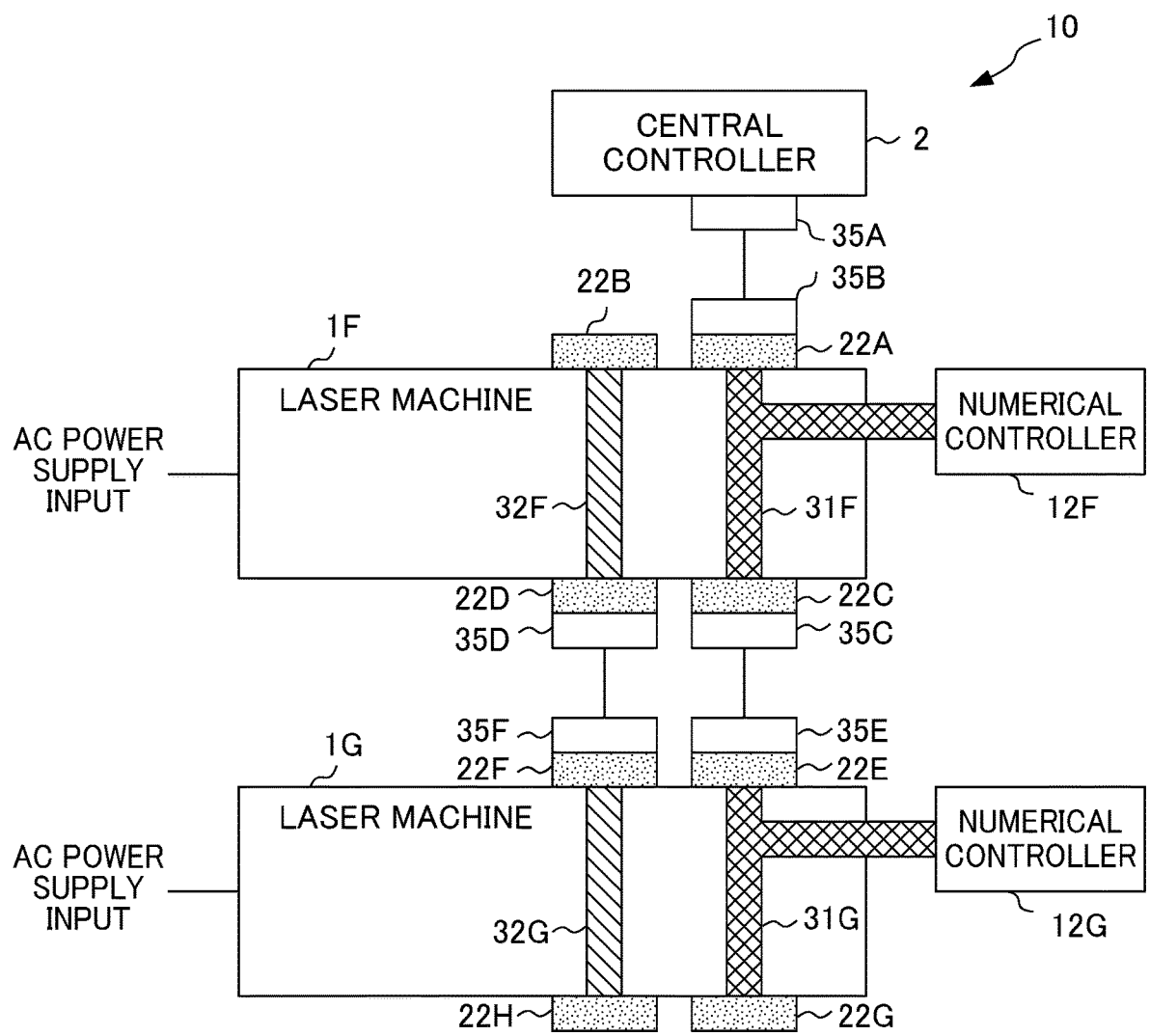
FIG. 7 is a functional block diagram of a laser machining system according to a seventh embodiment of the present invention.

FIG. 7 is a functional block diagram of a laser machining system 10 according to a seventh embodiment of the present invention. In the following description, a constituting element of each of a laser machine 1F and a laser machine 1G (in the following description, these machines may be called "laser machines 1" collectively) in the laser machining system 10 same as the constituting element of each of the laser machines 1 to 1E will be given the same sign and will not be described.

The laser machining system 10 includes the laser machines 1F and 1G, and a central controller 2. In some cases, the laser machining system 10 further includes a numerical controller 12F and a numerical controller 12G as separate parts from the laser machines 1F and 1G (in the following description, these controllers may be called "controllers 12" collectively). The laser machining system 10 further includes inter-machine connection means 35 in addition to these parts.

In the example of FIG. 7, only two laser machines 1F and 1G are illustrated as the laser machines 1. However, this is not the only configuration but the laser machining system 10 can include any number of laser machines 1.

Like the laser machines 1B to 1E according to the third to sixth embodiments, the laser machine 1F includes the communication means 31 (31F) and the power transmission means 32 (32F). The communication means 31F includes a connection part 22A and a connection part 22C. The power transmission means 32F includes a connection part 22B and a connection part 22D.

Likewise, the laser machine 1G includes the communication means 31 (31G) and the power transmission means 32 (32G). The communication means 31G includes a connection part 22E and a connection part 22G. The power transmission means 32G includes a connection part 22F and a connection part 22H.

Each of the laser machines 1F and 1G may be the same as the laser machines 1B to 1E according to the third to sixth embodiments, or may be a laser machine including the communication means 31 and the power transmission means 32 added to a publicly-known laser machine, for example. Like the laser machines 1B to 1E, each of the laser machines 1F and 1G may include the numerical controller 12 as a constituting element of the laser machine 1F or 1G itself. Alternatively, each of the laser machines 1F and 1G may not include the controller 12 as a constituting element of the laser machine 1F or 1G itself but the numerical controller 12 may be provided as a part separate from the laser machine 1F or 1G. Specifically, as illustrated in FIG. 7, the communication means 31F may be connected to the numerical controller 12F separate from the laser machine 1F, and the communication means 31G may be connected to the numerical controller 12G separate from the laser machine 1G.

The central controller 2 is a device that controls the laser machining system 10 as a whole. In the example of the illustration of FIG. 7, the central controller 2 controls the laser machines 1F and 1G, and the numerical controllers 12F and 12G.

Inter-machine connection means 35A is connected to the central controller 2. Inter-machine connection means 35B is connected to the connection part 22A. The inter-machine connection means 35A and the inter-machine connection means 35B are coupled to each other as one group. Likewise, inter-machine connection means 35C is connected to the connection part 22C. Inter-machine connection means 35E is connected to the connection part 22E. The inter-machine connection means 35C and the inter-machine connection means 35E are coupled to each other as one group. Likewise, inter-machine connection means 35D is connected to the connection part 22D. Inter-machine connection means 35F is connected to the connection part 22F. The inter-machine connection means 35D and the inter-machine connection means 35F are coupled to each other as one group.

The inter-machine connection means 35A, the inter-machine connection means 35B, the connection part 22A, the communication means 31F, the connection part 22C, the inter-machine connection means 35C, the inter-machine connection means 35E, the connection part 22E, the communication means 31G, and the connection part 22G function to share information about an operating situation between the central controller 2, the laser machine 1F, and the laser machine 1G. Likewise, the connection part 22B, the power transmission means 32F, the connection part 22D, the inter-machine connection means 35D, the inter-machine connection means 35F, the connection part 22F, the power transmission means 32G, and the connection part 22H function to share recyclable power between the laser machine 1F and the laser machine 1G.

It is assumed that multiple laser machines are used in one factory. In this case, even if each laser machine recycles power in a way optimum for each laser machine, optimum efficiency may not be achieved in the factory as a whole. To solve this issue, communication means and power transmission means are connected between multiple laser machines to share information about an operating situation and recyclable power as described above. In consideration of control over the factory as a whole, the central controller 2 for integrated control over the multiple laser machines may be provided and may be connected to the communication means 31F and the communication means 31G. Alternatively, one numerical controller 12 for a laser machine may be given a function as a host.

Effect Achieved by Seventh Embodiment

Interconnecting multiple laser machines allows sharing and distribution of energy between these laser machines, thereby achieving energy saving in a factory as a whole.

Working Example

Figure 8:
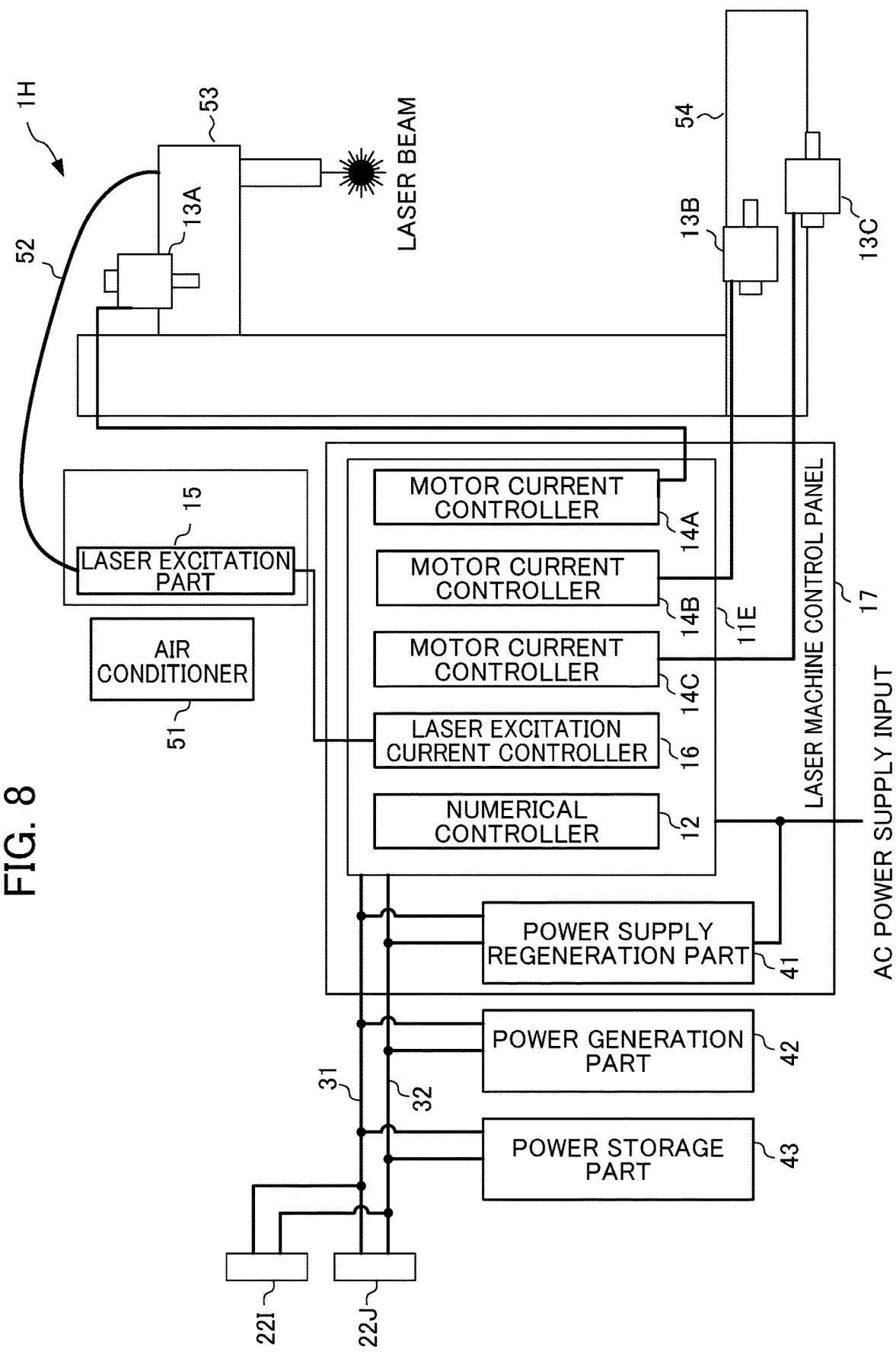
FIG. 8 shows the configuration of a laser machine according to a working example of the present invention.

FIG. 8 shows the configuration of a laser cutting machine 1H according to a working example of the present invention. The laser cutting machine 1H is based on the laser machine 1E according to the foregoing sixth embodiment. Thus, a constituting element of the laser cutting machine 1H same as the constituting element of the laser machine 1E will be given the same sign and will not be described in detail.

The laser cutting machine 1H includes a motor 13A, a motor 13B, a motor 13C (in the following description, these motors may be called "motors 13" collectively), the laser excitation part 15, a laser machine control panel 17, a connection part 22I and a connection part 22J for connection to different laser machines, the communication means 31, the power transmission means 32, the power generation part 42, the power storage part 43, an air conditioner 51, an optical fiber 52, a machining head 53, and a machining table 54. The laser machine control panel 17 includes the basic unit 11E and the power supply regeneration part 41. The basic unit 11E includes the numerical controller 12, a motor current controller 14A, a motor current controller 14B, a motor current controller 14C (in the following description, these motor current controllers may be called "motor current controllers 14" collectively), and the laser excitation current controller 16. While not shown in FIG. 8, the basic unit 11E further includes the AC input parts 111 and 113, and the AC/DC converters 112 and 114.

The motor 13A is provided at the machining head 53. Based on a command from the numerical controller 12, the motor current controller 14A drives the motor 13A, thereby moving the machining head 53. The motors 13B and 13C are provided at the machining table 54. Based on commands from the numerical controller 12, the motor current controllers 14B and 14C drive the motors 13B and 13C respectively, thereby moving the machining table 54. The motor current controller 14A corresponds to the motor 13A and controls a driving current to be supplied to the motor 13A, thereby driving the motor 13A. Likewise, the motor current controller 14B corresponds to the motor 13B and controls a driving current to be supplied to the motor 13B, thereby driving the motor 13B. Likewise, the motor current controller 14C corresponds to the motor 13C and controls a driving current to be supplied to the motor 13C, thereby driving the motor 13C.

The communication means 31 and the power transmission means 32 establish communication between the basic unit 11E, the power supply regeneration part 41, the power generation part 42, the power storage part 43, and the connection parts 22I and 22J for connection to different laser machines. By doing so, information about an operating situation and recyclable power are shared with the different laser machines.

The laser excitation part 15 is driven by the laser excitation current controller 16 to generate a laser beam. The generated laser beam passes through the optical fiber 52 and reaches the machining head 53. An area where the laser excitation part 15 exists is air conditioned by the air conditioner 51.

In this working example, the laser machine control panel 17 is configured mainly using a laser oscillator and a basic unit including the following integrated parts as constituting elements of a motor controller: the AC input parts 111 and 113, the AC/DC converters 112 and 114, the communication means 31, and the power transmission means 32. This configuration allows significant reduction in connection lines in the laser machine control panel 17, so that wasteful space can be reduced and the housing of the laser oscillator can be minimized. The laser oscillator shares the AC input part 113 and the AC/DC converter 114 with the motor current controller 14. Further, the laser excitation current controller 16 is mounted on the basic unit 11E. By doing so, the housing of the laser oscillator is only required to house the laser excitation part 15 to allow size reduction of the housing.

In this way, the laser excitation part 15 becomes the only part that needs air conditioning as countermeasure against dew condensation, thereby realizing size reduction and reduction in running cost of the air conditioner 51. The minimum size of the laser oscillator achieved as a secondary effect increases a degree of freedom in arrangement of the laser excitation part 15 in the configuration of the laser cutting machine 1H. Thus, the laser excitation part 15 can be positioned closer to the machining head 53 and this advantageously works to shorten the optical fiber 52 for transmission.

In this way, the power supply regeneration part 41 and the power generation part 42 for the motor 13 as energy-saving functions in the laser cutting machine 1H, and the power storage part 43 responsive to power failure are mounted.

The power supply regeneration part 41 is expected to achieve energy-saving effect by feeding counter-electromotive force generated during deceleration of the motor 13 back into the AC power supply.

Power may be supplied from the AC input parts 111 and 113 to the power storage part 43 and the supplied power may be stored in advance in the power storage part 43 to be used for retreating an axis in case of power failure or for backup purposes. The power storage part 43 may be any one of a rechargeable secondary cell, a capacitor bank using a large number of capacitors, and a momentum conservation device using a rotary motor and an inertial body in combination.

The power generation part 42 generates power using surplus heat exhausted during oscillation of the laser oscillator or heat generated by laser machining. More specifically, the power generation part 42 may generate power by a method using a Seebeck element, for example. Power generated by the power generation part 42 may also be fed back into the AC power supply or stored into the power storage part 43.

By the presence of the power transmission means 32, the laser oscillator and the AC/DC converter 114 for the motor 13 are integrated. This allows energy management in the laser cutting machine 1H as a whole in a unified manner, so that a laser machine with high energy efficiency can be provided. The numerical controller 12 exerts these controls relating to an energy-saving function through the communication means 31.

If multiple laser machines such as the laser cutting machines 1H are to be used in the same factory, what is important is not only the energy balance of each machine but also energy management in the factory as a whole. Such management may be realized by sharing surplus energy and state information about the surplus energy between the laser machines. In this working example, based on an assumption that each laser machine includes power transmission means and communication means, each laser machine includes the connection parts 22I and 22J for connection to different laser machines to tie multiple laser oscillators in a row. By doing so, surplus energy can be shared and distributed effectively to allow energy-saving operation of the factory as a whole. For such energy management, the numerical controller of one laser machine may function as a host controller and may be responsible for control over the factory as a whole. Alternatively, the factory as a whole may be controlled by a new and independent controller responsible for control in a unified manner connected to communication means.

Figure 9:
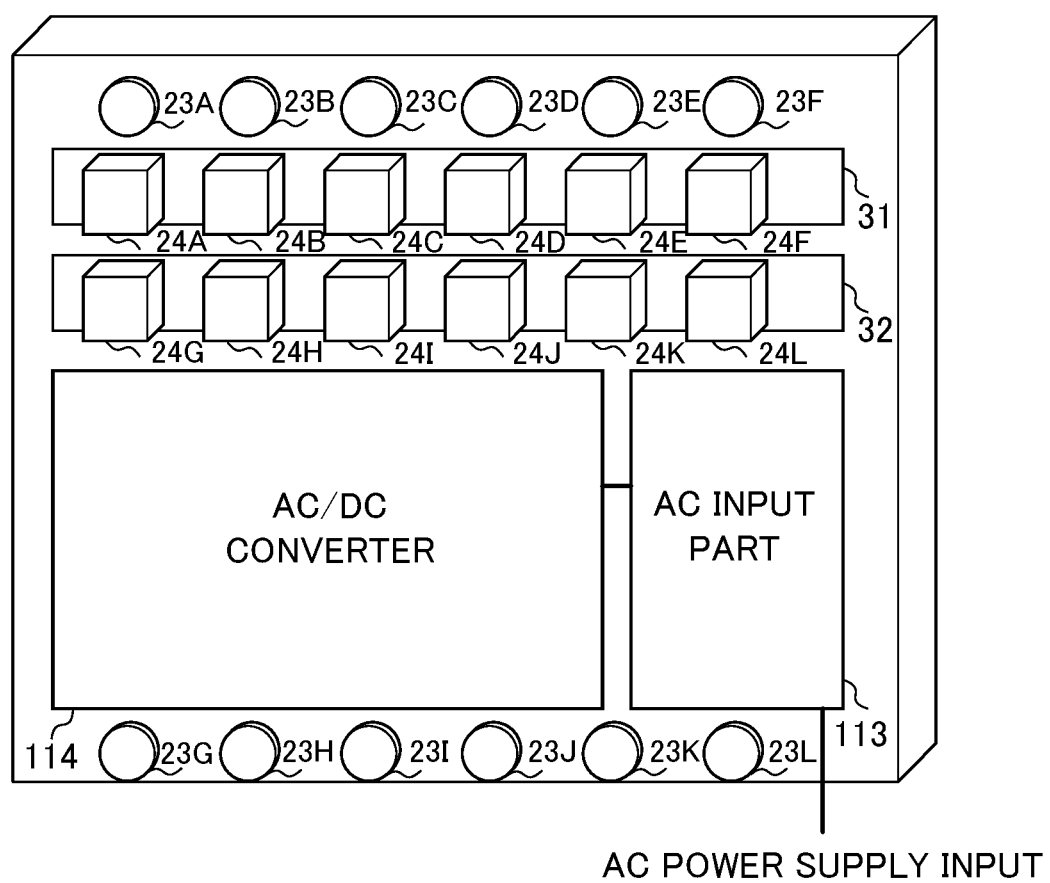
FIG. 9 is a perspective view of a basic unit according to the working example of the present invention.

FIG. 9 is a perspective view of the basic unit 11E according to this working example. The basic unit 11E includes the following parts housed in one housing: the AC input part 113, the AC/DC converter 114, mechanical connection parts 23A to 23L (in the following description, these connection parts may be called "mechanical connection parts 23" collectively), electrical connection parts 24A to 24L (in the following description, these connection parts may be called "electrical connection parts 24" collectively), the communication means 31, and the power transmission means 32. (The basic unit 11E may further include the AC input part 111 and the AC/DC converter 112.)

The electrical connection parts 24A to 24F are provided on the communication means 31. The electrical connection parts 24G to 24L are provided on the power transmission means 32.

By the presence of the mechanical connection parts 23A to 23L and the electrical connection parts 24A to 24L, each controller can be mounted directly on the basic unit 11E. For making a mechanical joint between each controller and the basic unit 11E through the mechanical connection part 23, fastening with a screw or a mechanism of making a fit between a recess and a projection may be used appropriately in response to the mass of each controller. Each controller is electrically connected to the communication means 31 and the power transmission means 32 of the basic unit 11E through the electrical connection part 24 such as a connector. The electrical connection part 24 may be configured to be capable of making connection to any controller. By doing so, a degree of freedom in mounting of each controller is increased. This makes it possible to ensure expandability and can be responsive to an intention to add one axis after a machine starts to operate, for example. In such a case, each controller may be given its identification code or an individual parameter to cause the numerical controller 12 to recognize such a code or a parameter through communication between each controller and the numerical controller 12.

By doing so, the numerical controller 12 is allowed to determine a machine configuration to distribute signals automatically without error. In this way, human error such as mistake in setting can be prevented.

If a current to be handled largely differs between controllers, configuring some of the electrical connection parts 24 to be connectable to limited connection destinations may be more preferable than using all the electrical connection parts 24 in common.

Figure 10:
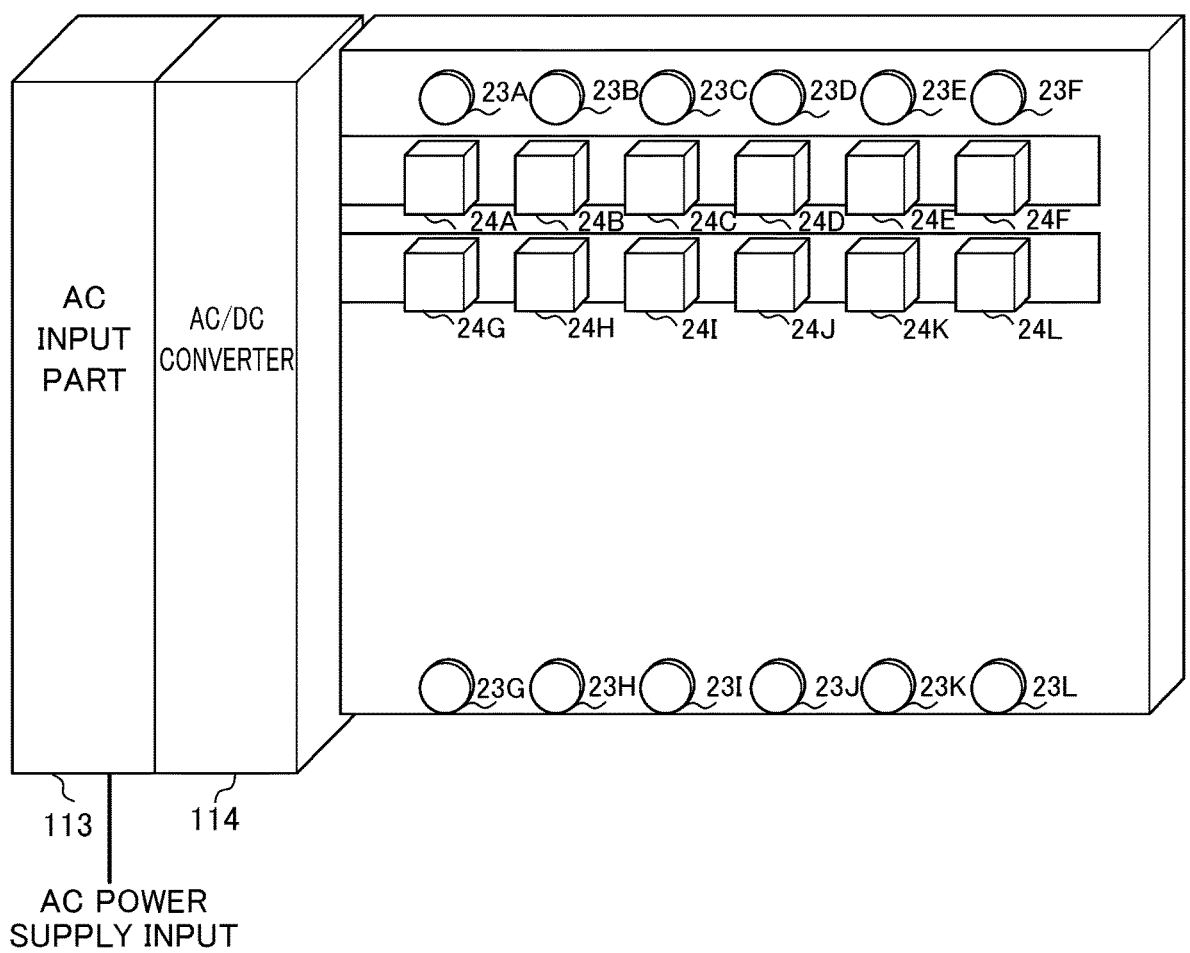
FIG. 10 is a perspective view of the basic unit according to the working example of the present invention.

The AC input part 113 and the AC/DC converter 114 may be incorporated in the basic unit 11E or may be configured to be easily separable from the basic unit 11E in consideration of maintainability. Further, the AC input part 113 and the AC/DC converter 114 may be configured to be accessible from their back surfaces so as to be removable even in the presence of each controller in the basic unit 11E. As shown in FIG. 10, to facilitate exchange of the AC input part 113 and the AC/DC converter 114, the AC input part 113 and the AC/DC converter 114 can be arranged at a right angle to the mechanical connection parts 23 and the electrical connection parts 24.

Figure 11:
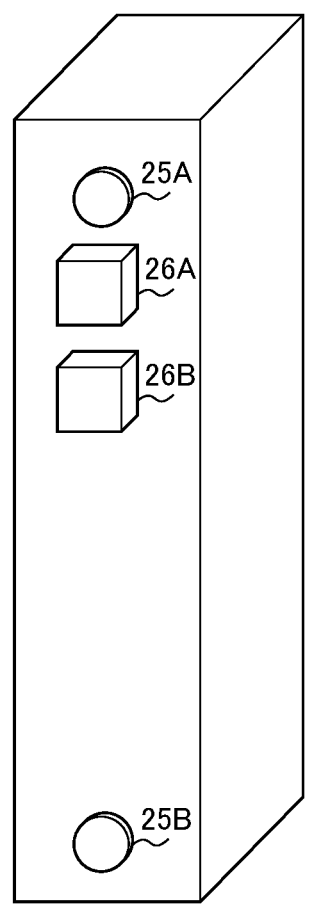
FIG. 11 is a perspective view of a controller according to the working example of the present invention.
Figure 12:
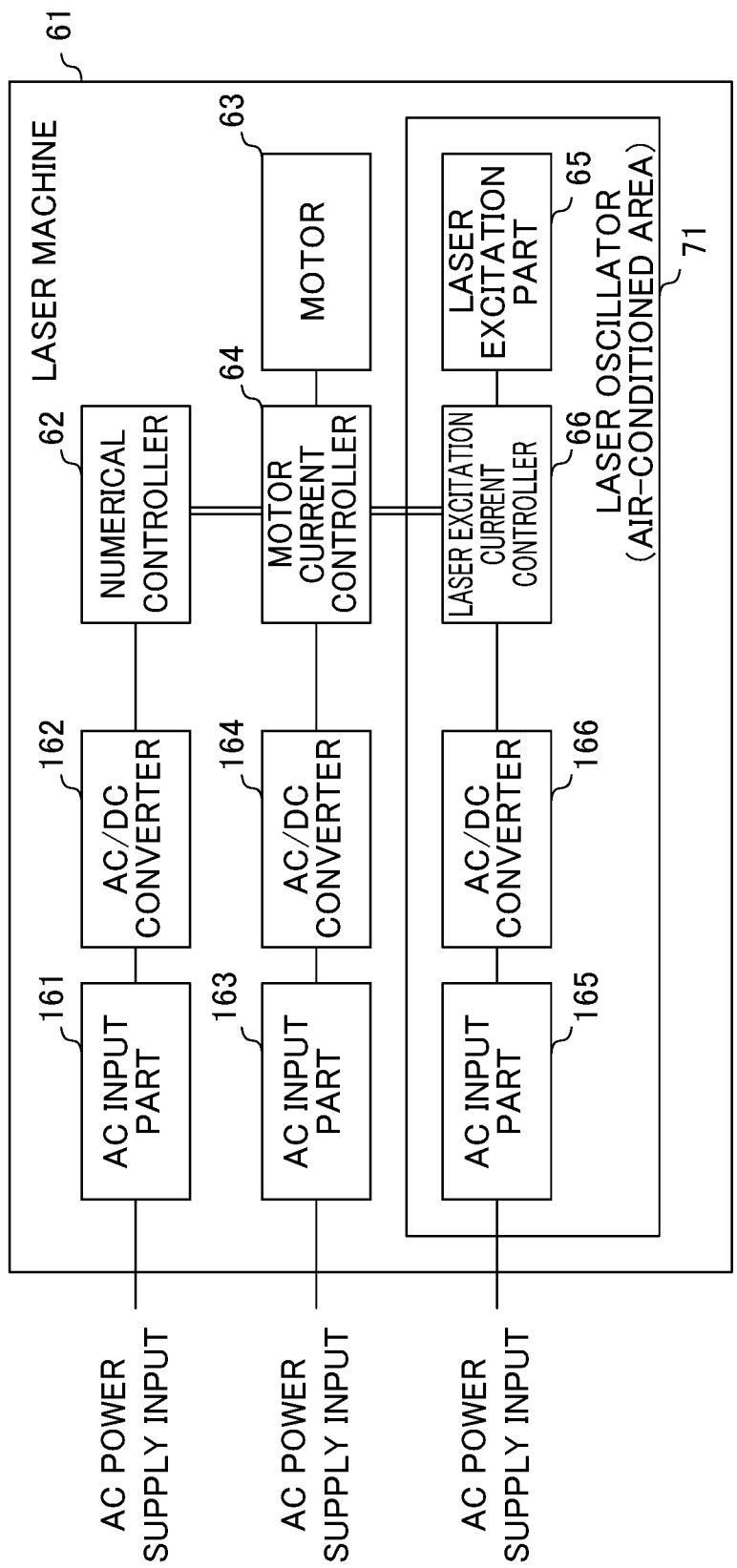
FIG. 12 is a functional block diagram of a conventional laser machine.
Figure 13:
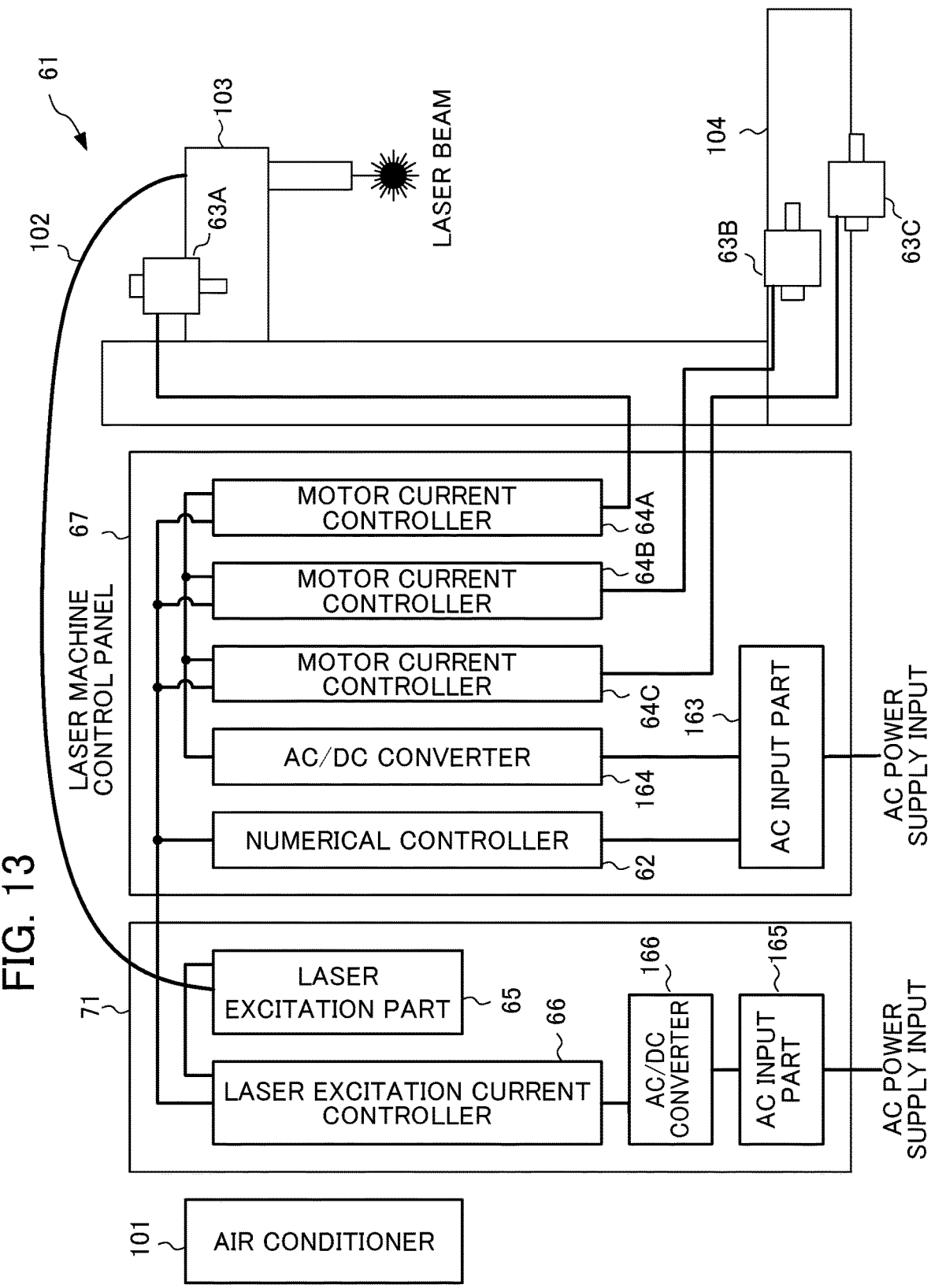
FIG. 13 shows how the conventional laser machine is implemented.

FIG. 11 is a perspective view of each controller. Each controller includes a mechanical connection part 25A and a mechanical connection part 25B (in the following description, these connection parts may be called "mechanical connection parts 25" collectively), and an electrical connection part 26A and an electrical connection part 26B (in the following description, these connection parts may be called "electrical connection parts 26" collectively). Each controller and the basic unit 11E are mechanically connected by making engagement between the mechanical connection part 25A and any of the mechanical connection parts 23A to 23F of the basic unit 11E and making engagement between the mechanical connection part 25B and any of the mechanical connection parts 23G to 23L of the basic unit 11E. Each controller and the basic unit 11E are electrically connected by making engagement between the electrical connection part 26A and any of the electrical connection parts 24A to 24F of the basic unit 11E and making engagement between the electrical connection part 26B and any of the electrical connection parts 24G to 24L of the basic unit 11E. The electrical connection part 26A is used for receipt and transmission of a control signal. The electrical connection part 26B is used for power supply. Further, each mechanical connection part 25 and each electrical connection part 26 may be arranged in a way common between the controllers.

Modifications

While the foregoing embodiments are preferred embodiments of the present invention, the scope of the present invention is not limited to the foregoing embodiments. Various modified embodiments of the present invention are applicable within a range not deviating from the substance of the present invention.

For example, the foregoing first to seventh embodiments may be combined to produce a new embodiment. More specifically, in each of the first to fourth embodiments and each of the sixth and seventh embodiments, not only the laser excitation part 15 but also the laser excitation current controller 16 may be arranged in an air-conditioned area, like in the fifth embodiment. In each of the first to fifth embodiments and the seventh embodiment, the laser machine may further include one or more of the power supply regeneration part 41, the power generation part 42, and the power storage part 43, like in the sixth embodiment. In each of the first to sixth embodiments, the numerical controller 12 may be provided as a separate part from the laser machine, like in the seventh embodiment.

EXPLANATION OF REFERENCE NUMERALS 1, 1A to 1G: Laser machine 1H: Laser cutting machine
2: Central controller 10: Laser machining system
11, 11A to 11E: Basic unit
12, 12F, 12G: Numerical controller
13, 13A to 13C: Motor
14, 14A to 14C: Motor current controller
15: Laser excitation part 16: Laser excitation current controller
17: Laser machine control panel
21, 21A to 21D, 22A to 22J: Connection part
23, 23A to 23L: Mechanical connection part
24, 24A to 24L: Electrical connection part
25, 25A, 25B: Mechanical connection part
26, 26A, 26B: Electrical connection part
31, 31F, 31G: Communication means
32, 32F, 32G: Power transmission means
35, 35A to 35F: Inter-machine connection means
41: Power supply regeneration part 42: Power generation part
43: Power storage part 51: Air conditioner
52: Optical fiber 53: Machining head 54: Machining table
61: Laser machine 62: Numerical controller
63, 63A to 63C: Motor
64, 64A to 64C: Motor current controller
65: Laser excitation part 66: Laser excitation current controller
67: Laser machine control panel 71: Laser oscillator
101: Air conditioner 102: Optical fiber 103: Machining head
104: Machining table
111, 113, 161, 163, 165: AC input part
112, 114, 162, 164, 166: AC/DC converter

What is claimed is:

1. A laser machine comprising:
    a numerical controller that controls motion of an axis for moving a machining point and output of a laser beam;
    a motor that causes the motion of the axis;
    a motor current controller that controls a driving current for the motor;
    a laser excitation part that generates the laser beam;
    a laser excitation current controller that controls a driving current for the laser excitation part;
    a basic unit that supplies DC power to the numerical controller, the motor current controller, and the laser excitation current controller;
    one or both of a power supply regeneration part that feeds counter-electromotive force of the motor back into an AC input part, and a power generation part that recovers heat energy generated by laser machining and converts the recovered heat energy to electric energy; and
    a power storage part that stores power supplied from the power supply regeneration part and/or the power generation part,
    the basic unit comprises:
        the AC input part that receives AC power;
        an AC/DC converter that converts the AC power supplied from the AC input part to DC power, and supplies the DC power to the motor current controller and the laser excitation current controller; and
        multiple connection parts that connect the basic unit to the numerical controller, the motor current controller, and the laser excitation current controller; and
    communication means and power transmission means, the communication means establishing communication between the numerical controller, the motor current controller, and the laser excitation current controller, the power transmission means transmitting power from the AC/DC converter to the motor current controller and the laser excitation current controller, wherein
    the power supply regeneration part, the power generation part, and the power storage part are connected to the power transmission means, and
    the communication means further establishes communication between the power supply regeneration part, the power generation part, and the power storage part.

2. The laser machine according to claim 1, wherein each of the multiple connection parts is connectable to at least one of the numerical controller, the motor current controller, the laser excitation current controller, and the AC/DC converter.

3. The laser machine according to claim 1, wherein the multiple connection parts are connected to the communication means and/or the power transmission means.

4. The laser machine according to claim 1, wherein at least one of the power supply regeneration part, the power generation part, and the power storage part is connected to the communication means.

5. The laser machine according to claim 1, wherein the communication means and/or the power transmission means comprises a connection part for connection to a different laser machine.

6. The laser machine according to claim 1, wherein the power transmission means is further connected to each of the motor current controller, the laser excitation current controller, and the AC/DC converter.

7. The laser machine according to claim 1, wherein the basic unit is configured to be mounted on a circuit board.

8. A laser machine comprising:
    a numerical controller that controls motion of an axis for moving a machining point and output of a laser beam;
    a motor that causes the motion of the axis;
    a motor current controller that controls a driving current for the motor;
    a laser excitation part that generates the laser beam;
    a laser excitation current controller that controls a driving current for the laser excitation part;
    an AC/DC converter that converts received AC power to DC power, and supplies the DC power to the motor current controller and the laser excitation current controller;
    a basic unit that supplies DC power to the numerical controller and supplies AC power to the AC/DC converter,
    one or both of a power supply regeneration part that feeds counter-electromotive force of the motor back into an AC input part, and a power generation part that recovers heat energy generated by laser machining and converts the recovered heat energy to electric energy; and
    a power storage part that stores power supplied from the power supply regeneration part and/or the power generation part,
    the basic unit comprises:
        the AC input part that receives AC power and supplies the AC power to the AC/DC converter; and
        multiple connection parts that connect the basic unit to the numerical controller, the motor current controller, the laser excitation current controller, and the AC/DC converter; and communication means and power transmission means, the communication means establishing communication between the numerical controller, the motor current controller, and the laser excitation current controller, the power transmission means transmitting power from the AC/DC converter to the motor current controller and the laser excitation current controller, wherein the power supply regeneration part, the power generation part, and the power storage part are connected to the power transmission means, and the communication means further establishes communication between the power supply regeneration part, the power generation part, and the power storage part.

9. The laser machine according to claim 8, wherein the power transmission means is further connected to each of the motor current controller, the laser excitation current controller, and the AC/DC converter.

10. The laser machine according to claim 8, wherein the basic unit is configured to be mounted on a circuit board.

\* \* \* \* \*